Dec. 9, 1969   H. NERWIN ET AL   3,482,681
STRIP MATERIAL MAGAZINES AND METHOD OF PRODUCING SAME
Filed July 18, 1967
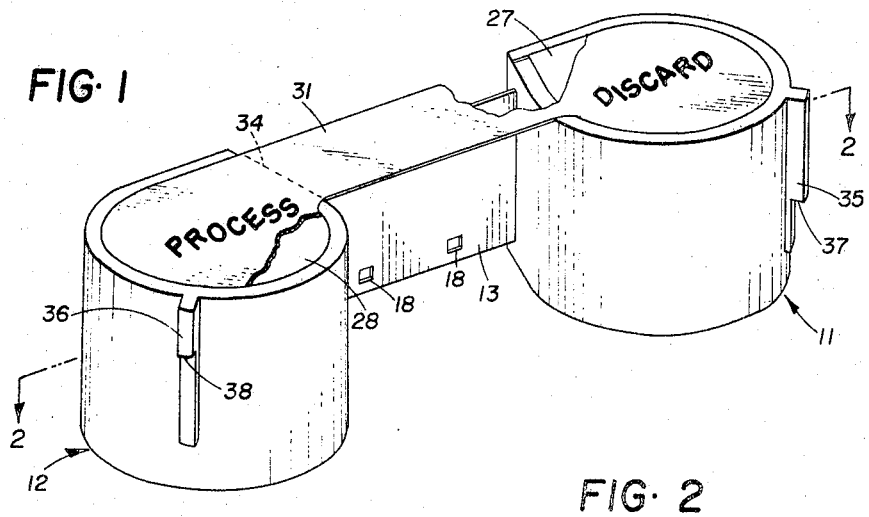
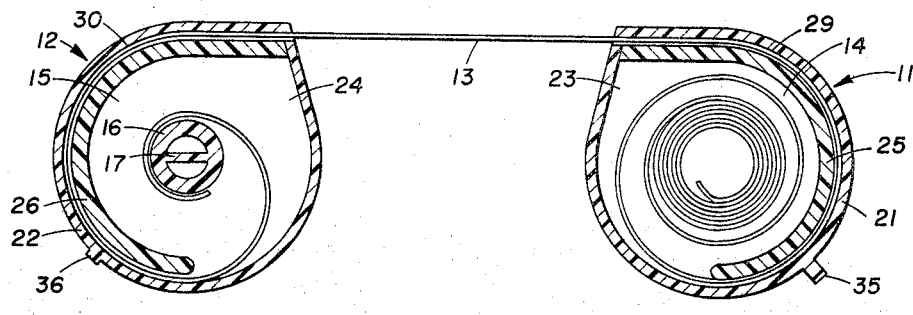
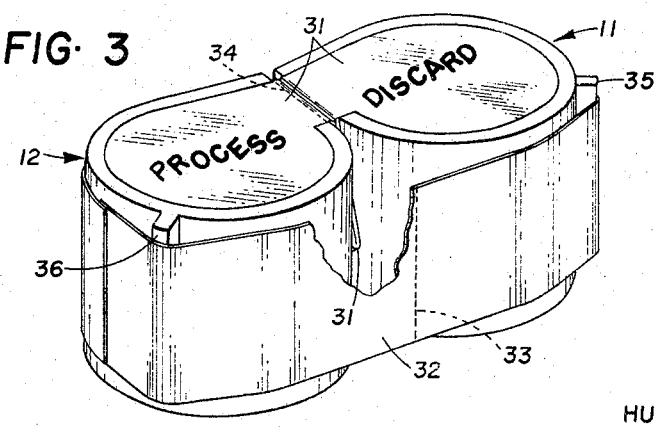
HUBERT NERWIN
JOHN H. EAGLE
INVENTOR.
BY Malcolm G. Dunn
Robert W Hampton
ATTORNEYS

United States Patent Office

3,482,681
Patented Dec. 9, 1969

3,482,681
STRIP MATERIAL MAGAZINES AND METHOD
OF PRODUCING SAME
Hubert Nerwin and John H. Eagle, Rochester, N.Y., assignors to Eastman Kodak Company, Rochester, N.Y., a corporation of New Jersey
Filed July 18, 1967, Ser. No. 654,154
Int. Cl. B65d 85/30, 85/50, 85/66, 85/67, 85/671
U.S. Cl. 206—46      9 Claims

ABSTRACT OF THE DISCLOSURE

Separate casings for film supply chamber and film take-up chamber are joined together by a flexible web such as paper, which web is foldable to position casings together as a package and is unfoldable to space casings proper distance apart for loading into a camera. After the film is exposed and is wound in the film take-up chamber, the casing with the film take-up chamber may be separated from the package by tearing the web along a perforation line.

---

The present invention relates to dual compartment magazines for elongate strip material, as for use in photographic or cinematographic cameras, and to packaging arrangements therefor.

To simplify the film loading operation, many cameras have been designed to employ pre-loaded film magazines comprising light-tight film supply and take-up casings defining respective chambers housing an elongate strip of film, which is supported in the focal plane of the camera lens along the portion of the strip between the chambers when the magazine is installed in the camera. In some magazines of this type, the two casings are permanently spaced by a rigid intermediate member, which may also serve to support the portion of film between the two chambers, with the spacing of the casings and the other dimensions of the magazine corresponding to the magazine receiving structure of a particular camera. Such magazines, however, are necessarily considerably bulkier than corresponding roll film or cassette loaded film employing only a single film casing, e.g., 35 millimeter film, thereby resulting in added expense in packaging, storing, shipping and mailing exposed magazines for processing, and in personal inconvenience when it is desired to carry a number of fresh or exposed magazines. To alleviate this factor, some magazines of this general type have employed hinge members permanently joining the casings together to allow at least portions of the casings to be moved apart with the film extending therebetween, or have been provided with releasable means for temporarily maintaining the casings together until they are disconnected for installation of the magazine into a camera. However, the former type of construction employing permanently attached hinged casings adds significantly to the expense of producing the magazine, which is particularly significant if the magazine is intended not to be reloaded but simply to be discarded after use. On the other hand, in the latter type of construction in which the casings are disconnected from one another except by the film strip when the casings are separated, the two casings may accidentally be pulled too far apart for reception into the camera, thereby exposing an unnecessarily long portion of the film and requiring the excess film between the casings to be manually wound into the take-up casing before the magazine can be properly installed.

It is therefore a primary object of the present invention to reduce the cost and bulk of such a disposable double chamber film magazine, while still providing means for establishing the proper spacing of the two casings, to facilitate loading the magazine into an appropriate camera and to prevent accidental exposure of the film which may result if means are not provided to limit the maximum distance by which the casings can be moved apart. This object is realized by joining the take-up casing to the supply casing by a length of flexible inexpensive web material, such as paper, which is foldable to allow the casings to be positioned adjacent one another, and which unfolds to limit the spacing of the casings to the proper distance for loading the magazine into a particular camera. Another important object of the invention is to allow the film take-up casing to be completely separated from the supply casing after all the film has been exposed, whereby the empty supply casing may be discarded and only the full take-up casing need be taken or sent to the film processor. Still another object of the invention is to further simplify the handling of such magazines by releasably securing together the adjacent casings thereof, to provide a compact package which, if desired, may be handled, carried and stored without an additional protective carton or the like.

It is also known in the prior art to provide film magazines with tactile coding means indicative of the speed or sensitivity and of the type of film therein, which means serve to adjust automatically a camera exposure mechanism to a proper speed setting and to enable exposed magazines to be sorted automatically for appropriate processing of various types of film. Yet another object of the invention, therefore, is to further simplify the provision of film magazines with such coding means.

Other objects will be readily apparent from the following description, reference being made to the accompanying drawings in which:

FIGURE 1 is an enlarged perspective view of a film magazine according to a preferred embodiment of the invention, showing the film casings in spaced relation, with portions of the connecting web shown removed for illustrative purposes;

FIGURE 2 is a top section view of the film magazine taken along the line 2—2 of FIGURE 1; and FIGURE 3 is an enlarged perspective view of the magazine shown in FIGURE 1 with the film casings thereof held together in adjacent relation by a perimetric band to form a magazine package.

Referring first to FIGURES 1 and 2, the film magazine comprises a film supply casing 11 and a film take-up casing 12 which, in the preferred embodiment of the invention, are formed of molded plastic material. An elongate film strip 13 is initially wound upon itself in the film supply chamber 14 defined by casing 11 and extends between the casings into the film take-up chamber 15 defined by casing 12, where it is attached to a take-up spindle 16. Spindle 16 is rotatably supported in a light-tight manner by the bottom wall of casing 12, with transverse web 17 of the spindle 16 being engageable by a winding member (not shown) of a camera when the magazine is installed therein, to wind the film onto the spindle. As shown at 18, the film strip may be provided with metering holes along one edge thereof, which cooperate with a metering pawl in the camera to regulate the advancement of successive portions of the film into alignment with the image focused onto the film between the casings when the camera shutter is operated.

Casings 11 and 12 are substantially allochiral housings comprising, respectively, outer wall members 21 and 22 contiguous with their associated bottom wall members 23 and 24. Curved inner wall members, as shown at 25 and 26, are provided in casings 11 and 12, respectively, and extend between the corresponding bottom wall members 23 and 24 and the respective top wall members 27 and 28, which are cemented or otherwise sealed at the tops of the casings after the film has been installed.

The inner wall members 25 and 26, which preferably are formed integrally with the corresponding top wall members, are spaced from the adjacent outer walls of the casings to define narrow arcuate film channels 29 and 30 in the respective casings 11 and 12. Such channels provide arcuate light-tight film paths between the chambers and exterior portions of the casings to prevent light from entering the chambers and damaging the sensitized film therein.

Referring to FIGURES 1 and 3, the two casings are joined by a foldable connecting web 31 extending between the top wall members 27 and 28. The connecting web may be made of any suitable thin flexible material and might comprise a foldable plastic strip molded integrally with the two upper wall members. However, paper appears to be particularly suitable as the web material, with the ends of the paper strip being cemented or otherwise bonded to the upper wall members. As shown in FIGURE 3, the magazine is initially packaged with the two casings secured together in adjacent relation to one another by a perimetric band 32 of paper, pressure sensitive tape, or other suitable material, with the connecting web 31 being folded downwardly between the two casings. In this compact magazine package the film strip is protected from light within the film supply chamber, thereby allowing the magazine to be removed from the carton or other wrapper in which it might desirably be sold without endangering the film therein. To facilitate removal of the band, a perforation line may be provided, as shown at 33, along which the band may readily be torn.

After the band is removed, the two casings are spaced from one another to the extent permitted by the web, as shown in FIGURE 1, whereby their relative positions correspond to the magazine receiving structure of the particular camera with which the magazine is to be employed. It should be understood that the short portion of film between the properly spaced casings will be exposed to light during the loading operation, but this unusable film area is simply wound into the take-up chamber after the magazine is loaded into the camera before making exposures. However, if no connecting web were provided, the casings might accidentally be separated by a much greater distance than required, thereby exposing and ruining an unnecessarily long length of film between the casings.

After the film strip has been exposed in the camera, it is completely wound into the film take-up chamber 15 by the film winding mechanism of the camera, whereby the film is completely protected from light after the magazine has been removed from the camera. At this stage, however, the empty film supply chamber serves no further purpose and simply adds unnecessary bulk to the magazine. Accordingly, the empty film supply casing is separated from the full take-up casing by tearing the connecting web. It is of course important that the web be sufficiently strong to discourage accidental tearing thereof without being so strong as to resist intentional tearing. However, by providing means for weakening the web along a transverse line, as by means of a line of perforations as shown at 34, the web is substantially resistant to being torn by a straight longitudinal force but may be easily torn by an intentional angular pulling force tending to initiate severance of the web at either end of the perforation line. To identify the two casings and minimize the possibility of the wrong one being discarded, the words "DISCARD" and "PROCESS," or other suitable indicia, may be printed on the ends of the web bonded to the respective film supply and take-up casings, as shown in FIGURES 1 and 3, with further appropriate instructions also being included on the web as desired.

From the foregoing, it is apparent that this invention affords maximum reduction in the bulk of a double casing film magazine by positioning the casings in immediate proximity to one another prior to use and by eliminating entirely the empty film supply casing after the film in the magazine has been exposed.

The magazine coding means, previously mentioned, comprise a film speed coding rib 35 on casing 11 and a film type coding rib 36 on casing 12. Each of these ribs is either initially molded or later cut away so that the location of a surface thereof relative to the casing is indicative of the value of the coded factor. For example, the position of the lower surface 37 of rib 35 might indicate a film speed or sensitivity of ASA 100, whereas, if the magazine contained film having a speed of ASA 200, the lower surface might be correspondingly closer to the top wall of the casing. Similarly, the relative location of lower surface 38 on rib 36 is indicative of the type of film in the magazine. When the magazine is installed in the camera, a sensing member engages surface 37 to adjust an exposure control mechanism of the camera in accordance with the speed of the film in the magazine. Likewise, when the film take-up casing is received by the film processor, a similar sensing member in an automatic magazine sorting machine detects the location of surface 38 relative to the take-up casing to determine the type of film therein, so that the film can be processed accordingly. Similar coding means have previously been employed on non-separable film magazines, but the present invention further simplifies the provision of such coding means by enabling the casings to be coded separately and thereafter combined in any appropriate combination. For example, film of a particular film type may be available with various speed ratings, each of which requires a different location of the speed coding surface. Therefore, rather than having differently coded complete magazines for each different film, or applying the coding to the casings after the magazines are loaded, it is possible to produce any magazine coding combination from a relatively limited number of pre-coded supply and take-up casings, thereby eliminating the necessity of a secondary coding operation, or, alternatively, the maintenance of a large inventory of pre-coded magazine housings including all of the required film type and speed coding combinations.

While the illustrated magazine is of a configuration appropriate for relatively narrow film used in miniature cameras, it should be apparent that the invention is equally appropriate for use with other types of film, both for still cameras and also for motion picture cameras. Since these and other modifications are within the spirit of the invention, the foregoing description is to be considered as illustrative only and not as limiting the scope of the invention.

We claim:
1. A film magazine comprising:
   (a) a substantially rigid film supply casing defining a light-tight film supply chamber communicating with the exterior of said film supply casing through a first light-tight channel;
   (b) a substantially rigid film take-up casing defining a light-tight film take-up chamber communicating with the exterior of said film take-up casing through a second light-tight channel; and
   (c) a flexible web of predetermined length attached to the exterior of said casings to connect said casings and allow free movement of the casings between first positions in which said casings are in closely adjacent relation to one another and second positions in which said casings are spaced by a predetermined distance established by said web, said web being sufficiently strong to discourage accidental separation of said casings beyond said second positions but capable of being readily broken to enable said casings to be separated intentionally beyond said second positions.

2. A film magazine according to claim 1 in which said web is foldable to locate at least a portion thereof between said casings are in said first positions.

3. A film magazine according to claim 1 in which said web is weakened along a predetermined line transverse to its length to facilitate intentional separation of said web along said line.

4. A film magazine according to claim 1 in which said casings each include an end surface, and said web is formed of paper with opposite end portions, one end portion overlaying and affixed to the end surface of one said casing, and the other end portion overlaying and affixed to the end surface of the other said casing.

5. A film magazine according to claim 4 in which the opposite end portions of said web include visible indicia indicating the appropriate disposition of the respective casings after exposure of the film in the magazine.

6. A film magazine according to claim 1 including coding means comprising:
   (a) a first coding member forming a first tactile surface discontinuity on said film supply casing representative of the sensitivity of film ordinarily contained in said magazine; and
   (b) a second coding member forming a second tactile surface discontinuity on said film take-up casing representative of the type of film ordinarily contained in said magazine.

7. A method of producing a film magazine having film supply and film take-up casings provided respectively with tactile coding means representative of the sensitivity and type of an elongate strip of film incorporated in said magazine, said method comprising:
   (a) selecting a film supply casing having tactile coding means representative of the particular sensitivity of such film strip from a plurality of similar film supply casings having respective tactile coding means representative of various film sensitivities;
   (b) selecting a film take-up casing having tactile coding means representative of the particular type of such film strip from a plurality of similar film take-up casings having respective tactile coding means representative of various types of film;
   (c) installing said elongate strip of film in such selected casings with one end thereof wound within the selected film supply casing and the other end thereof extending between the selected casings and into the selected film take-up casing;
   (d) sealing the respective selected casings by applying closure members thereto to exclude light from the film therein; and
   (e) joining the selected casings by connecting opposite ends of a web to the respective selected casings with a predetermined length of said web extending between the casings.

8. A strip material package comprising:
   (a) two casings consisting of:
      (1) a supply casing, and
      (2) a take-up casing;
   (b) a strip of elongate material with opposite end portions thereof extending respectively into said two casings through respective openings in said casings;
   (c) an elongate flexible web connecting said casings at opposite ends of said web with a predetermined length of said web extending between said casings; and
   (d) packaging means comprising a removable band extending about both of said casings to maintain said casings together with said respective openings thereof adjacent one another and with at least a major portion of said web along said predetermined length thereof folded between said casings in interadjacent relation thereto.

9. A strip material package according to claim 8 in which said band is weakened along a predetermined line transverse to its length to facilitate severing said band for removal thereof from said casings.

References Cited

UNITED STATES PATENTS

| 2,646,911 | 7/1953 | Holmberg | 206—65 |
| 2,653,752 | 9/1953 | Vogt | 229—69 |
| 3,300,041 | 1/1967 | Fuller | 206—65 |
| 3,276,714 | 10/1966 | Steisslinger et al. | 242—71.2 |

WILLIAM T. DIXSON, Jr., Primary Examiner

U.S. Cl. X.R.

242—71.2

PO-1050
(5/69)

UNITED STATES PATENT OFFICE
CERTIFICATE OF CORRECTION

Patent No. 3,482,681   Dated December 9, 1969

Inventor(s) Hubert Nerwin and John H. Eagle

It is certified that error appears in the above-identified patent and that said Letters Patent are hereby corrected as shown below:

Column 4, line 75, add "when said casings"

SIGNED AND
SEALED
SEP 15 1970

(SEAL)
Attest:

Edward M. Fletcher, Jr.
Attesting Officer

WILLIAM E. SCHUYLER, JR.
Commissioner of Patents